H. M. CUSHMAN ET AL.
BOTTLE HANDLING AND TESTING APPARATUS.
FILED AUG. 14, 1920.

Patented Feb. 20, 1923.

1,446,161

UNITED STATES PATENT OFFICE.

HORACE M. CUSHMAN, CHARLES M. CUSHMAN, AND WALTER A. WASHBURN, OF MILLIS, MASSACHUSETTS, AND HORACE E. KIMBALL, OF PROVIDENCE, RHODE ISLAND, ASSIGNORS TO CLIQUOT CLUB COMPANY, OF MILLIS, MASSACHUSETTS, A CORPORATION OF RHODE ISLAND.

BOTTLE HANDLING AND TESTING APPARATUS.

Application filed August 14, 1920. Serial No. 403,584.

*To all whom it may concern:*

Be it known that we, HORACE M. CUSHMAN, CHARLES M. CUSHMAN, WALTER A. WASHBURN, residing at Millis, in the county of Norfolk, State of Massachusetts, and HORACE E. KIMBALL, residing at Providence, in the county of Providence, State of Rhode Island, have invented certain new and useful Improvements in Bottle Handling and Testing Apparatus, of which the following is a specification.

Our invention relates to means for handling and testing hermetically-sealed containers such as bottles, jars, cans or the like and consists particularly of improvements in bottling-machines for bottling beverages or other charged liquids.

The principal object of the improvement is to provide means for testing the bottles or other containers after they have been sealed or capped to determine if the seals or closures are air-tight.

A particular object of the improvement is to provide means for receiving the bottles as they are capped or crowned and traversing them through a tank while rolling them on their sides to expose defective seals by the escape of gas or air through the water in the tank.

Another object of the improvement is to provide for rolling the bottles or other containers through the tank on their sides with their sealed ends slightly elevated to insure that the gas or air will rise through the leak in the seal where such exists.

Another object of the improvement is to provide means for bringing the bottles to erect position after they have been traversed through the testing-tank and to then transfer them to the labeling-machine or other apparatus for their further treatment.

Other objects of the improvement will appear from the following specification which describes a preferred embodiment of the invention as applied to use with bottling-machines; the description being illustrated by the accompanying drawings in which like reference-characters designate like parts. In the drawings:

As before stated the preferred embodiment of our invention is herein shown as applied to use with bottling-machines and like apparatus, for instance in connection with the bottle-filling, sealing, labeling and similar devices employed for bottling carbonated or charged beverages and the like. It is to be understood, however, that the invention is also adapted for use in handling and testing other sealed containers such as jars, cans and the like employed for preserving fruit, vegetables and other comestibles. The term bottle is therefore herein employed in a broad sense as indicating any sealed vessel or container.

In accordance with the preferred practice beverages are usually bottled by a continuous sequence of operations consisting in first: washing and sterilizing the bottles; second: placing the required quantity of essence or extract in the bottles; third: filling the bottles with carbonated or charged water; fourth: sealing or capping the bottles with corks or crowned metal disks; and finally: labeling the bottles and delivering them to the crates in which they are packed for shipment. All of these several operations are performed automatically with the bottles passing through the washing, filling and labeling-machines in a continuous procession, while being transferred between the machines on traveling belts, chains or other conveyors. As the bottles vary somewhat in the size and shape of the lips at their mouths the automatic crown-capping machines which apply the cork-lined metal seals or caps to the bottles sometimes fail to seal the bottle air-tight. Such defective sealing or capping is comparatively infrequent yet nevertheless, each bottle must be tested in order to make sure that its seal is absolutely tight so that the contents will be protected from deterioration or spoilage. It is the usual practice to test the bottles by immersing them in water to detect any leakage of their charged contents by the appearance of gas or air bubbles issuing therefrom; and heretofore it has been necessary to perform the testing operation manually, each bottle being handled individually by removing it from the conveyor, submerging it in the tank of water and then placing it back on the conveyor again to transfer it to the labeling-machine. Such individual manipulation of the bottles is a slow and tedious process and it is the principal object of our present improvement to provide means for handling the bottles or containers automatically in passing them through the testing-tank.

Figure 1:
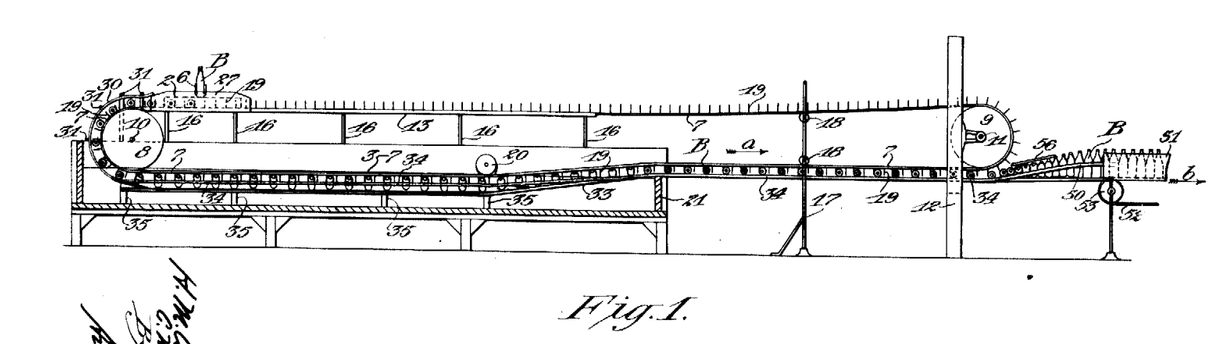
Fig. 1 is a side elevation of a preferred embodiment of our improved bottle-handling apparatus, showing the testing-tank in section to illustrate the manner in which the bottles are passed therethrough.
Figure 2:
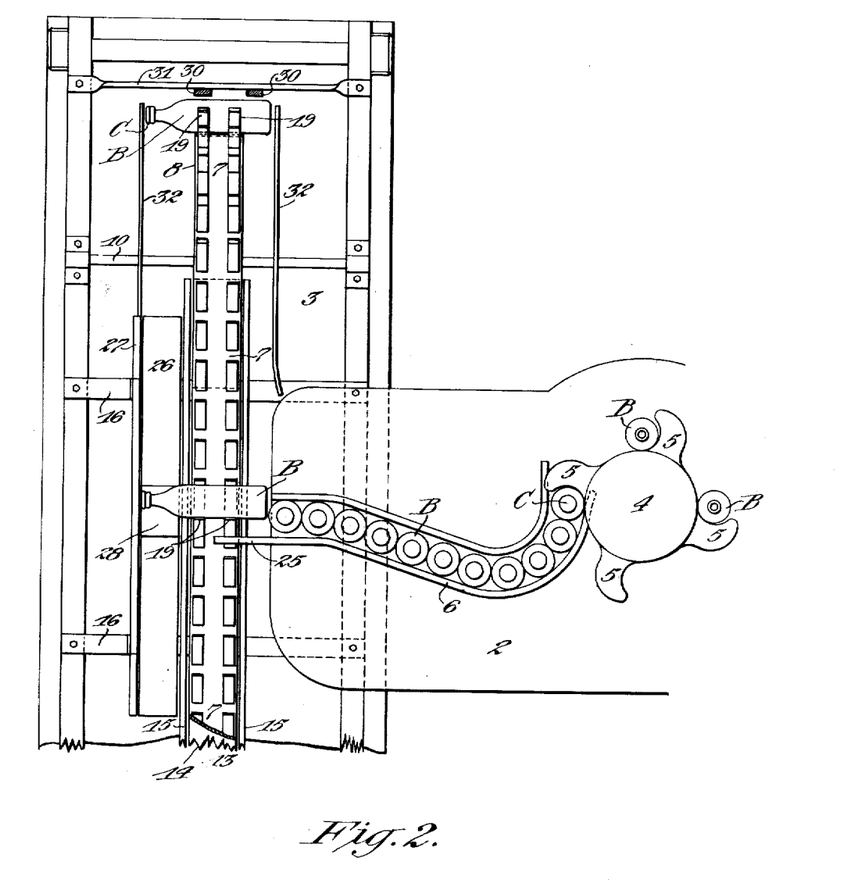
Fig. 2, an enlarged plan view of the receiving-end of the tank, showing the means for transferring the bottles from the sealing or crowning-machine to the conveyor-means in the tank.
Figure 3:
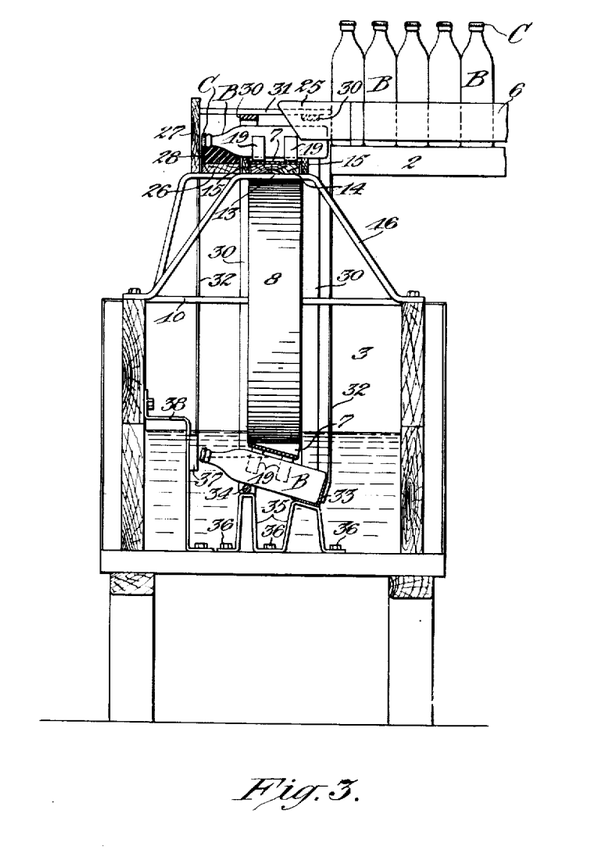
Fig. 3, a cross-sectional view of the tank and bottle-conveying means looking toward its receiving-end.

Referring to Figs. 1, 2 and 3 of the drawings, 2 designates the table of a bottle-sealing machine, or crown-capper as it is sometimes called; and 3 is the testing-tank which may be of any suitable construction and, as here shown, is supported from the floor in position beneath the table 2. The bottles B are transferred from the filling-machine by suitable traveling belts or conveyors, not herein shown, and are passed across the table 2 beneath the sealing or capping mechanism which operate to apply crown-seals to their mouths. The bottles B are carried around beneath the sealing-heads by means of an intermittently-rotating turret 4, see Fig. 2, having projecting horns or arms 5 which engage the sides of the bottles to slide them on the table 2. After the bottles have been sealed or capped they are carried into a curved chute or runway 6 which leads out to the side of the table 2 overhanging the tank 3. From the runway 6 the bottles are fed onto a traveling belt or conveyor 7 passing through the tank 3 and arranged in the manner as next described.

Referring to Figs. 1 and 3, the conveyor-belt 7 is stretched between two drums or pulleys 8 and 9, the forward pulley 8 being journaled on a shaft 10 extending between suitable bearings mounted on the sides of the tank 3, while the rearward pulley 9 is mounted on a shaft 11 journaled in bearings on posts or uprights 12 arranged at some distance from the end of the tank. One or the other of the pulleys 8 and 9 may be driven by gears, belts, sprockets or the like connected to a line-shaft, motor or other source of power to adapt the conveyor 7 to be traveled in the direction indicated by the arrow a, Fig. 1. The upper length of the conveyor 7 passes over a horizontal support or guideway 13 which may be constructed from boards 14, see Fig. 3, with side-strips 15 projecting thereabove, the whole being supported on trusses 16 fastened to the top-sides of the tank 3. As a further support and guiding-means for the conveyor a standard 17 is arranged between the end of the tank 3 and the pulley 9 with idler-rollers 18 bearing against the inner sides of the belt 7. The conveyor 7 may be of any suitable construction comprising either flat links or a continuous belt or band from which project perpendicular spurs or arms 19. As shown in Figs. 2 and 3 the arms 19 may consist of angle-shaped strips of metal arranged in pairs crosswise of the belt with their foot-pieces riveted thereto. The arms 19 are spaced equidistantly apart longitudinally of the belt 7 to adapt a bottle to enter between each two pairs in the series. The conveyor 7 passes down around the pulley 8 and leads back to the pulley 9 in substantially parallel relation to the bottom of the tank 3, but near the right-hand end of the tank, see Fig. 1, it passes under an idler-pulley 20 and thence is inclined upwardly to cause it to lead out of the tank above the top of the end section 21. The under side of the conveyor-belt 7 is somewhat slack and the pulley 20 is set at a slight angle to the horizontal so that the belt will be caused to pass through the tank in laterally inclined relation to the bottom thereof, see Fig. 3.

Referring to Figs. 2 and 3, the sealed bottles B are successively entered into the runway 6 by the rotary action of the turret 4 and are pushed outwardly therethrough toward the side of the table 2. After the runway 6 becomes filled with bottles each newly-sealed bottle carried thereinto will cause the furthermost bottle of the series to be pushed off from the edge of the table 2 whereby it will drop down into horizontal position across the traveling belt or conveyor 7. To guide the bottles B in their descent onto the belt 7 one of the upright side walls of the runway 6 is extended outwardly beyond the side of the table 2 in an overhanging guard 25, see Fig. 3. On the opposite side of the conveyor 7 is a shelf 26 provided with a vertical guard-strip 27 adapted to engage the top of the bottle to prevent it from being thrown outwardly too far across the conveyor. In some instances a block 28 of rubber or a pad of felt is fastened to the top of the shelf 26 in position to receive the neck of the bottle to cushion its descent onto the conveyor 7 whereby to prevent breakage; or if preferred, a sluggish buffer-spring may be employed for the same purpose. As the bottles B are received in the pockets between the projecting arms 19 of the belt 7 the travel of the conveyor will cause them to be carried down around the drum or pulley 8, and to prevent them from falling out of the pockets circular guard-strips 30 are provided surrounding the periphery of the pulley. The guards 30 may consist of flat hoops or bands of metal secured to cross-struts 31 supported from the sides of the tank 3, see Figs. 1 and 2. As shown in Fig. 2, lateral guard-strips 32 are arranged at the sides of the belt 7 and continued downwardly around the sides of the pulley 8, see also Fig. 3, to prevent the bottles from being displaced laterally of the conveyor.

Referring to Fig. 3, on the bottom of the tank 3 is a trackway for the bottles arranged at an angle corresponding to the inclination of the lower stretch of the belt 7. The trackway may be of any suitable construction and as herein shown comprises longitudinal tracks or rails 33 and 34 supported on tressel-like brackets 35 bolted to the bottom of the tank 3 at 36. One track 33 is preferably constructed from angle-iron to provide a chair-like seat or trough for the bottom of the bottle B; while the opposite track 34 may be in the form of a cylindrical rod arranged at a distance from the angle-iron 33 in position to support the bottle at a point just below its shoulder. The tracks 33 and 34 are fastened to the top of the brackets 35 and extend in parallel, spaced relation substantially the full length of the tank, being inclined at a slight angle to the bottom of the tank, as shown in Fig. 3, to support the neck of the bottle raised above its base. The trackway slopes upwardly at the right-hand end of the tank 3, see Fig. 1, and the rails 33 and 34 are brought into horizontal relation therebeyond whereby to level the bottles on their sides as they travel out of the tank. Referring again to Fig. 3, a vertical guard-strip 37 is supported from brackets 38, fastened to the side and bottom of the tank, and extends along the side of the trackway in parallel relation therewith to prevent the bottles from rising up out of the angle-iron rail 33.

Figure 4:
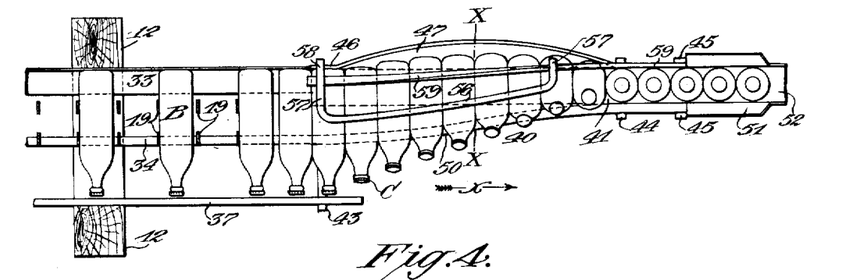
Fig. 4, a plan view of the bottle-righting and transferring-means at the delivery-end of the tank.
Figures 5, 6:
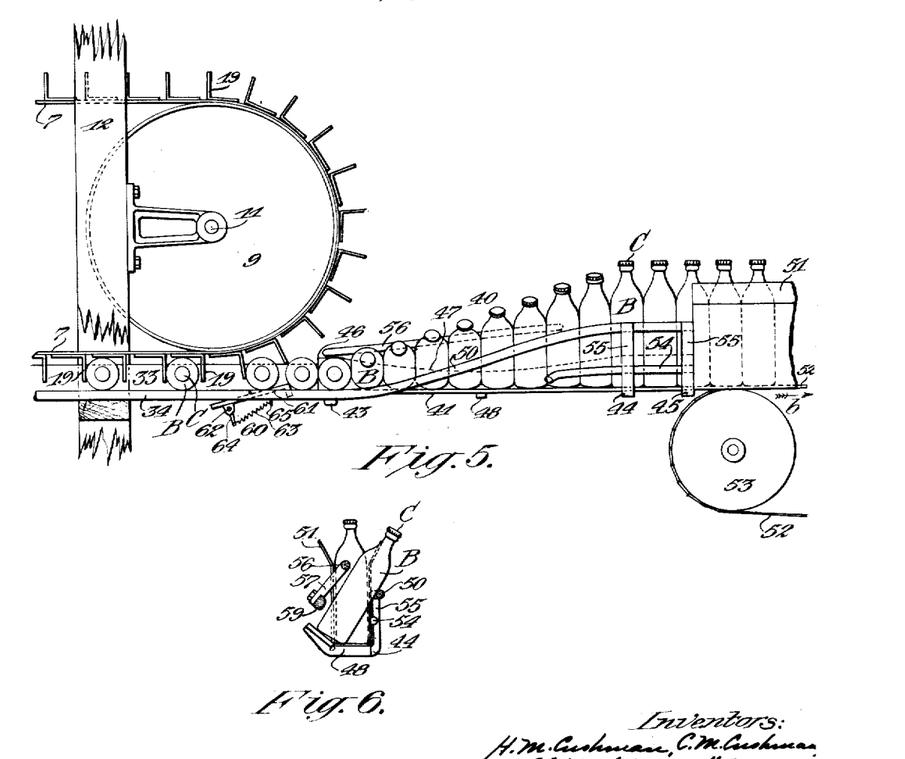
Fig. 5, a side elevation of the same.
Fig. 6, a cross-sectional view of the bottle-righting means taken on the line X—X of Fig. 4, looking in the direction indicated by the arrow *x*.

As the bottles are conveyed out from the end of the tank 3 they pass up the incline of the trackway toward the conveyor pulley 9 and are delivered to an erecting-device which rights them on their bottoms and transfers them to a conveyor running to the labeling-machine. The means for returning the bottles to erect position is arranged as follows:

Referring to Figs. 4, 5 and 6, the angle-iron 33 is continued beyond the pulley 9 in a trough-shaped track or runway 40 comprising a flat bottom strip 41, see Fig. 4. The end of the strip 41 is secured to the end of the angle-iron 33. and fastened to its under side are cross-cleats or brackets 43, 44 and 45, see Figs. 5 and 6. The upright side of the angle-iron 33 is continued in a strip 46 fastened to its end, and at 47 the side-strip is swelled outwardly in a sweeping curve as illustrated in Fig. 4. This curved and inclined portion 47 of the strip 46 is reinforced by an angular bracket 48 fastened to the under side of the strip 41, see Fig. 6, the inclination of the strip being for the purpose of assisting to guide the bottles into upright position in the manner as later explained. The main righting-means for the bottles consists in an extension 50 of the rail or track 34 which is bent upwardly on an incline as shown in Fig. 5. The extension-rail or ramp 50 is also bent inwardly toward the opposite side strip 46 and arranged in parallel relation thereto to provide a passageway for the bottles leading into a straight-sided trough or runway 51. The runway 51 extends above a traveling belt or conveyor 52, see Fig. 1, one end of which runs over a pulley 53 in the direction indicated by the arrow b to convey the bottles to the labeling-machine or other apparatus in which they are to be further treated.

Referring again to Figs, 4, 5 and 6, the bottles are guided into the runway 51 at the bottom by a guard-strip or rod 54, which like the end of the ramp 50, is supported on arms 55 extending upwardly from the brackets or cleats 44 and 45. Arranged above the trackway outwardly beyond the drum or pulley 9 is an overhead guard-rail 56 formed from a rod having an extension 57 fastened to the side-strip 46 at 58 and supported at its opposite end by a rail 59 which reaches out from the end of the runway 51. The guard-rail 56 and rail 59 overlie the sides of the bottles as they rise up the incline of the lifting-rail or ramp 50 and serve to prevent the bottles from being crowded out of position.

As the bottles B are delivered from the conveyor 7 to the righting-device they are held from rolling back down the incline of the ramp 50 by means of a check-pawl or detent 60, illustrated in Fig. 5. Any suitable device may be employed for this purpose and, as here shown, a pawl or rocker-arm 61 is pivoted at 62 between the rails 33 and 34 with its end adapted to engage the side of a bottle. A spring 63 fastened to an arm 64 on the detent-pawl 61 is anchored at 65 to the rail 34, and tends to maintain the pawl in raised position while allowing it to be depressed as each bottle passes over it.

The construction and arrangement of a preferred embodiment of the invention having now been described in detail its method of operation will next be explained. As before noted, the filled bottles B are received on the table 2 of the sealing- or capping-machine from a conveyor which conveys them from the filling-machine where the contents are supplied thereto. As the bottles B are fed onto the table 2 they are successively grasped by the arms 5 of the intermittently-rotating turret 4 and carried around under the sealing-heads which apply the cork-lined caps C and crimp them over the lips of the bottles. After being capped the bottles are delivered into the runway 6 and when the latter is filled each newly-sealed bottle entered thereinto will cause the end bottle of the series to be pushed off the table 2 onto the conveyor belt 7. As the bottle drops off from the edge of the table 2 it is guided into place between the arms 19 on the belt 7 by the guard 25 and the strip 27 at the side of the shelf 26, see Figs. 2 and 3. The buffer-block or pad 28 receives the neck of the bottle to check its descent onto the conveyor whereby to guard against breakage. It will be understood that the conveyor-belt 7 is traveled continuously on its pulleys 8 and 9, and preferably, its speed is timed so that the bottles seat themselves in alternate pockets between the arms 19. As the bottles are traversed away from the delivery-chute or runway 6 down around the pulley 8 they are held in place in the pockets on the belt 7 by the circular guard-strips 30 which lead onto the end of the trackway in the bottom of the tank 3. In this way the bottles B are carried onto the trackway with their bottom ends guided into the angle-iron rail 33 and their shoulders resting on the raised track 34. As the bottles rest in this position on the trackway, see Fig. 3, their sealed ends will be elevated sufficiently to cause their contents to seek a level which leaves a gas or air space adjacent their sealed mouths. Now as the bottles rest on their sides with the arms 19 of the belt 7 engaging therewith, the travel of the belt will cause them to be rolled along the trackway. It has before been explained that the tank 3 is partly filled with water, and as the bottles are rolled along the trackway they are completely submerged with their capped ends raised to the highest level. The rolling of the bottles serves first to cause their contents to be stirred or agitated whereby the extract is thoroughly mixed wih the water; and further the gas or air at the top of the bottles is given free vent to escape through any minute leak which may exist around the seal of the cap C. An inspector sits at the side of the tank 3 and as the bottles pass under his eye any faulty seal will be easily detected by the bubbles rising to the surface of the water in the tank. Bottles having defective or leaky seals may thus be easily discovered and lifted off from the conveyor so that only perfectly sealed bottles are passed along to be labeled and boxed for shipment.

As the bottles pass beyond the inspector they are traveled up the incline of the trackway and out from the end of the testing-tank to the pulley 9. As the belt 7 travels around the pulley 9 the bottles are fed out from its pockets onto the righting device, shown in Figs. 4 and 5, and are caused to be righted on their bottoms in the following described manner. The bottles are slid along the trackway in horizontal position as they roll out of the conveyor 7, and as each bottle is delivered therefrom it acts to push the next preceding bottle along to carry it onto the righting device. In this way the bottles are forced along the rail 46 with their shoulders resting on the ramp 50 and the incline of the latter acts to gradually tilt the bottles into vertical position. The curved side 47 of the rail 46 serves as an inclined guideway for the bottom of the bottles, see Fig. 6, which, when they reach the end of the ramp 50, are finally stood on the bottom strip 41. The guard-rails 56 and 59 prevent the bottles from being crowded out of place as they are forced up along the ramp 50 and the check-pawl or detent 61 holds the bottles from sliding back toward the conveyor-belt 7. As the bottles are righted on their bottoms they pass into the chute or runway 51 and are taken up by the conveyor 52 which transfers them to the labeling machine or other destination.

It will be observed that our present invention provides an entirely automatic apparatus for handling bottles or other containers in testing their closures after they have been capped or otherwise sealed, whereby defective seals may be readily detected; and furthermore the manipulation of the bottles in the testing-tank serves to thoroughly stir and mix their contents. The improved apparatus is adapted for use as a part of the continuous conveyor-means which transfers the bottles from one machine to another during the several operations of washing, filling, capping and labeling the same, and hence all manual handling or manipulation is dispensed with whereby a considerable saving in time and labor is effected. The improved apparatus also eliminates breakage of bottles and waste of their contents from careless handling and in addition provides for a more thorough inspection and test of their seals.

It will be obvious that the improved apparatus may be employed for different types of containers and in connection with other forms of handling machines than those herein shown. Likewise, various modifications may be made in the structure and arrangement of the apparatus without departing from the spirit or scope of the invention: therefore, without limiting ourselves to the precise embodiment herein shown and described, what we claim is:

1. A device of the class specified comprising a testing-tank for bottles and other containers, and mechanically-operated means for rolling the containers through the tank with their sealed ends elevated above their bottoms to expose imperfect seals by the escape of gas or air bubbles through the water in the tank.

2. A device of the class specified comprising a testing-tank for containing water, mechanically-operated means for rolling sealed bottles or other containers through the tank on their sides, and means to maintain the bottles in inclined position in the tank to provide for the detection of leaks in their seals by the escape of gas or air bubbles through the water in the tank.

3. A device of the class specified comprising a testing-tank for containing water, and mechanically-operated means for rolling sealed bottles or other containers through the tank on their sides with their sealed ends elevated above their bottoms to cause the escape of gas or air from defective seals through the water in the tank.

4. A device of the class specified comprising a testing-tank for containing water, a traveling conveyor for passing bottles or other sealed containers through the tank, and means for guiding the containers to cause them to assume an inclined position in the tank with their sealed ends elevated to allow the escape of gas or air from defective seals through the water in the tank.

5. A device of the type specified comprising a testing-tank for containing water, a traveling conveyor for passing bottles or other containers through the tank, and a trackway having rails for supporting the bottles on their sides as they travel through the tank, one rail being elevated above the other to cause the bottles to assume an inclined position with their sealed ends uppermost to allow gas or air to escape from defective seals through the water in the tank.

6. In a testing device for use with bottle-sealing machines and like apparatus, the combination of a traveling conveyor for receiving the bottles from the sealing-machine, a testing-tank containing water through which the conveyor travels, and a trackway in the tank consisting of a chair-like rail for the bottom of the bottles and an opposite elevated rail for supporting the shoulders of the bottles to bring their sealed ends into raised position whereby to cause gas or air to escape from defective seals through the water in the tank.

7. In a testing device for use with bottle-sealing machines and like apparatus, the combination of a continuous traveling conveyor, of means to transfer bottles or other containers into horizontal position on the conveyor, a testing tank containing water through which the lower stretch of the conveyor travels, a trackway beneath the lower stretch of the conveyor, and means to guide the containers onto the trackway whereby they are caused to be rolled therealong by the conveyor to mix their contents while allowing the escape of gas or air from defective seals through the water in the tank.

8. In a testing device for use with bottle-capping machines or like apparatus, the combination of a testing-tank for containing water, a traveling conveyor passing through the tank, means to feed the bottles onto the conveyor crosswise thereof, a trackway beneath the conveyor adapted to support the bottles on their sides to adapt them to be rolled therealong, and an inclined ramp at the end of the trackway adapted to engage the sides of the bottles to right them on their bottoms as they pass out of the tank.

9. In an apparatus for testing bottles and other containers, the combination of a chute for receiving the bottles as they are capped, a traveling conveyor arranged beneath the chute to adapt it to receive the bottles on their sides as they are fed out from the chute, buffer means for checking the descent of the bottles as they drop from the chute, and a tank for containing water through which the bottles are passed by the conveyor to test their seals.

10. In an apparatus for testing bottles and other containers, the combination with a testing-tank of a traveling conveyor for passing the bottles through the tank on their sides, a trackway onto which the bottles are transferred and an inclined ramp at one side of the trackway adapted to raise the bottles to erect position to stand them on their bottoms.

11. In an apparatus for testing bottles and other containers, the combination with a testing-tank of a traveling conveyor for passing the bottles through the tank on their sides, a trackway onto which the bottles are transferred, an inclined ramp at the side of the trackway adapted to raise the bottles into erect position, and detent means for holding the bottles to prevent them from sliding back on the ramp.

12. In an apparatus for testing bottles and other containers, the combination with a testing tank of a conveyor traveling over drums, means to deposit the bottles on their sides on the conveyor, means to guide the bottles down around the end drum of the conveyor, a trackway in the tank arranged below the bottom stretch of the conveyor to support the bottles as they are rolled therealong, and an inclined ramp at the end of the trackway along which the bottles are slid to right them on their bottoms.

13. In an apparatus for testing sealed bottles and other containers, the combination of a tank for containing water, a continuous traveling conveyor having pockets for receiving the bottles on their sides, means for supporting the conveyor with its lower stretch traveling through the water in the tank, a trackway beneath the conveyor adapted to support the bottles as they are rolled therealong by the travel of the conveyor, and an inclined ramp at the end of the trackway for raising the bottles to right them on their bottoms as they leave the track.

In testimony whereof we affix our signatures.

HORACE M. CUSHMAN.
CHARLES M. CUSHMAN.
WALTER A. WASHBURN.
HORACE E. KIMBALL.

Certificate of Correction.

It is hereby certified that the name of the assignee in Letters Patent No. 1,446,161, granted February 20, 1923, upon the application of Horace M. Cushman, Charles M. Cushman, and Walter A. Washburn, of Millis, Massachusetts, and Horace E. Kimball, of Providence, Rhode Island, for an improvement in "Bottle Handling and Testing Apparatus," was erroneously written and printed as "Cliquot Club Company, of Millis, Massachusetts, a Corporation of Rhode Island," whereas said name should have been written and printed as *Clicquot Club Company, of Millis, Massachusetts, a Corporation of Rhode Island*, as shown by the records of assignments in this office; and that the said Letters Patent should be read with this correction therein that the same may conform to the record of the case in the Patent Office.

Signed and sealed this 20th day of March, A. D., 1923.

[SEAL.]

KARL FENNING,
*Acting Commissioner of Patents*